United States Patent Office.

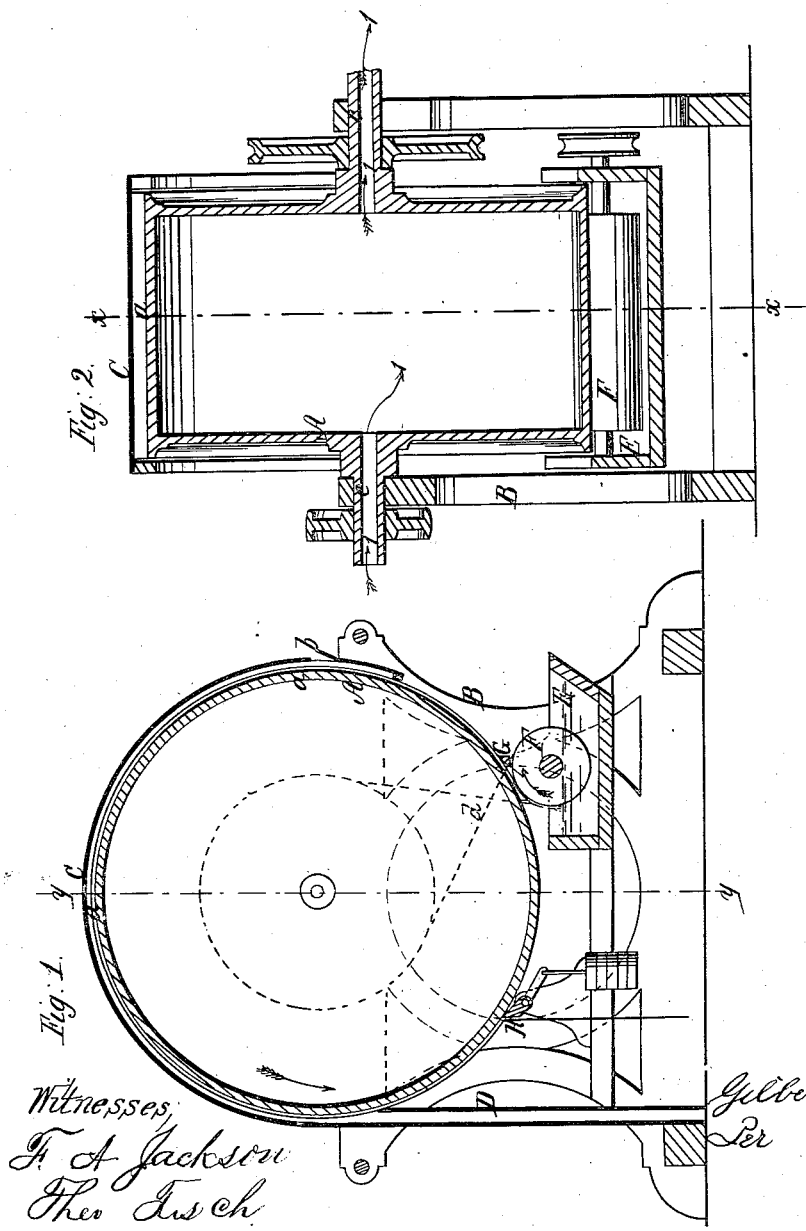

APPARATUS FOR DRYING ARTISTS' MATERIALS.

GILBERT D. JONES, OF NEW YORK, N. Y.

Letters Patent No. 60,382, dated December 11, 1866.

---

The Schedule referred to in these Letters Patent and making part of the same.

---

TO ALL WHOM IT MAY CONCERN:

Be it known that I, GILBERT D. JONES, of the city, county, and State of New York, have invented a new and improved Drying Apparatus; and I do hereby declare that the following is a full, clear, and exact description thereof, which will enable others skilled in the art, to make and use the same, reference being had to the accompanying drawing, forming a part of this specification; in which—

Figure 1 is a side sectional view of my invention, taken in the line $x\ x$, fig. 2.

Figure 2 is a transverse vertical section of the same, taken in the line $y\ y$, fig. 1.

Similar letters of reference indicate like parts.

This invention relates to a new and improved apparatus or device for drying substances, and is more especially designed for drying earthy materials used in the arts, which are ground in water or are rendered plastic or tempered in the same, such, for instance, as whiting, clay, &c.

A represents a cast iron cylinder or drum, which is hollow and has a smooth periphery, $a$. This cylinder is hung in a suitable framing, B, and its upper part above the framing, B, is covered by a jacket, C, which may be constructed of sheet metal, a space, $a$, being allowed between the jacket and the periphery of the cylinder, as shown in both figures. The space, $a$, between the jacket, C, and the periphery of the drum or cylinder, A, communicates, by means of a pipe, D, with a hot-air chest containing a fan or other suitable means for impelling a current of hot air through the space, $a$, an aperture or vent, $b$, being made in the jacket, C, near the end opposite to that where the hot air is admitted. (See fig. 1.) E represents a hopper or trough into which the wet or plastic substance to be dried is placed. This hopper or trough is placed underneath the drum or cylinder, a little at one side of its centre; and within the hopper or trough there is placed a roller, F, which is partially submerged in the material to be dried. The roller, F, is quite near to the periphery of the drum or cylinder, A; and directly over the roller, F, between it and the drum or cylinder, A, there is placed a blade, G, which is designed to serve as a trowel and spread the wet material evenly over the periphery of the drum or cylinder, A, as the latter rotates. The direction of the rotation of the drum or cylinder and roller is indicated by the arrows upon them, the roller being driven from one of the journals, $c$, of the drum or cylinder, A, by means of a cross-belt, $d$. The substance to be dried is carried up from the hopper or trough, E, to the periphery of the drum or cylinder, A, by the roller, F, and said substance is dried in passing around within the space, $a$, owing to its being subjected to a hot blast while in space $a$. The dried substance is scraped from the periphery of the drum or cylinder, A, by means of a knife, H, arranged in any suitable manner. By this simple means substances of the kind specified may be ground in an expeditious and perfect manner. The drum or cylinder, A, is heated by means of steam passing through it, as indicated by the arrows, the journals, C, of the drum or cylinder being tubular, the steam being conducted into one tube and discharged through the other. The heated periphery of the drum or cylinder, in connection with the hot blast through the space, $a$, causes the hot substance to be rapidly dried, and without any danger of being overheated and injured by the process.

Having thus described my invention, I claim as new, and desire to secure by Letters Patent—

The rotating heated drum or cylinder A, having its periphery partially enclosed by a jacket, C, forming a hot-air passage, $a$, in connection with a spreading-knife or trowel, G, and a scraper or discharging-knife, H, all arranged to operate in the manner substantially as and for the purpose set forth.

I further claim the roller F, when used in connection with the heated drum or cylinder A, and trowel G, to operate substantially as and for the purpose herein set forth.

G. D. JONES.

Witnesses:
 WM. F. McNAMARA,
 ALEX. F. ROBERTS.